(12) United States Patent
Rabetge et al.

(10) Patent No.: US 8,892,454 B2
(45) Date of Patent: Nov. 18, 2014

(54) CONFIGURATION OF WEB SERVICES

(75) Inventors: Christian Rabetge, Sinsheim (DE);
Thomas Kunz, Lilienweg (DE);
Alexander Zubev, Pazardzhik (BG);
Otto Boehrer, Wiesloch-Schatthausen (DE); Volker Wiechers, Heidelberg (DE); Timm Falter, Kreuzaecker (DE);
Vladimir Savchenko, Sofia (BG);
Harish Mehta, Walldorf (DE)

(73) Assignee: SAP SE, Walldorf (DE)

( * ) Notice: Subject to any disclaimer, the term of this patent is extended or adjusted under 35 U.S.C. 154(b) by 1895 days.

(21) Appl. No.: 11/863,029

(22) Filed: Sep. 27, 2007

(65) Prior Publication Data
US 2009/0089109 A1    Apr. 2, 2009

(51) Int. Cl.
| | | |
|---|---|---|
| *G06F 17/50* | (2006.01) |
| *G06F 9/44* | (2006.01) |
| *G06Q 40/00* | (2012.01) |
| *G06F 9/445* | (2006.01) |
| *G06Q 10/06* | (2012.01) |
| *G06Q 10/10* | (2012.01) |
| *G06Q 30/02* | (2012.01) |
| *G06Q 40/02* | (2012.01) |
| *G06Q 40/06* | (2012.01) |
| *G06Q 20/10* | (2012.01) |
| *G06Q 40/04* | (2012.01) |
| *H04L 29/08* | (2006.01) |

(52) U.S. Cl.
CPC .......... *G06F 9/44505* (2013.01); *G06Q 10/063* (2013.01); *G06Q 10/10* (2013.01); *G06Q 10/06* (2013.01); *G06Q 10/0631* (2013.01); *G06Q 30/02* (2013.01); *G06Q 40/00* (2013.01); *G06Q 40/02* (2013.01); *G06Q 40/06* (2013.01); *G06Q 20/10* (2010.01); *G06Q 40/04* (2013.01); *G06Q 30/0201* (2013.01); *H04L 67/16* (2013.01); *H04L 67/02* (2013.01)

USPC ................................................ 705/7; 705/35

(58) Field of Classification Search
CPC ....... G06F 10/063; G06F 10/10; G06F 10/06; G06F 10/0631; G06F 30/02; G06F 40/00; G06F 40/02; G06F 40/06; G06F 20/10; G06F 40/04; G06F 30/0201; G06F 67/16; G06F 67/02
USPC ......................................................... 705/7, 35
See application file for complete search history.

(56) References Cited

U.S. PATENT DOCUMENTS 5,918,227 A * 6/1999 Polnerow et al. .................... 1/1
5,958,013 A * 9/1999 King et al. .................... 709/227

(Continued)

OTHER PUBLICATIONS

Designing a Practical ATM LAN, Edoardo Biagioni and Robert Sansom; IEEE, Mar. 1993, pp. 32-39.*

*Primary Examiner* — Matthew Gart
*Assistant Examiner* — Harshad Parikh
(74) *Attorney, Agent, or Firm* — Mintz Levin Cohn Ferris Glovsky and Popeo, P.C.

(57) ABSTRACT

Methods and apparatus, including computer program products, for configuration of web services. In general, data is received characterizing web service calls for an application, a placeholder destination for the web service calls, and an identification of a system to be mapped to the placeholder; and a configuration is generated for the web service calls, where the configuration maps the placeholder destination to the system. The configuration may be a configuration of proxy objects to make the web service calls. Mapping the placeholder destination to the system may include generating a configuration including the system in lieu of the placeholder destination. Systems may be included in domains, where a security policy may be applied to systems in a domain.

20 Claims, 3 Drawing Sheets

(56) References Cited

U.S. PATENT DOCUMENTS

| | | | |
|---|---|---|---|
| 6,006,260 A * | 12/1999 | Barrick et al. | 709/224 |
| 6,012,088 A * | 1/2000 | Li et al. | 709/219 |
| 6,038,601 A * | 3/2000 | Lambert et al. | 709/226 |
| 6,067,568 A * | 5/2000 | Li et al. | 709/223 |
| 6,101,407 A * | 8/2000 | Groezinger | 600/407 |
| 6,138,157 A * | 10/2000 | Welter et al. | 709/224 |
| 6,195,660 B1 * | 2/2001 | Polnerow et al. | 707/758 |
| 6,230,199 B1 * | 5/2001 | Revashetti et al. | 709/224 |
| 6,237,031 B1 * | 5/2001 | Knauerhase et al. | 709/221 |
| 6,286,047 B1 * | 9/2001 | Ramanathan et al. | 709/224 |
| 6,362,836 B1 * | 3/2002 | Shaw et al. | 715/744 |
| 7,720,905 B1 * | 5/2010 | O'Connell, Jr. | 709/202 |
| 7,831,693 B2 * | 11/2010 | Lai | 709/220 |
| 2001/0034771 A1 * | 10/2001 | Hutsch et al. | 709/217 |
| 2002/0019786 A1 * | 2/2002 | Gonzalez et al. | 705/28 |
| 2002/0133390 A1 * | 9/2002 | Kroeger | 705/9 |
| 2003/0144852 A1 * | 7/2003 | Eckert et al. | 705/1 |
| 2004/0148183 A1 * | 7/2004 | Sadiq | 705/1 |
| 2004/0148184 A1 * | 7/2004 | Sadiq | 705/1 |
| 2004/0148588 A1 * | 7/2004 | Sadiq | 717/109 |
| 2004/0236639 A1 * | 11/2004 | Candadai et al. | 705/27 |
| 2004/0249650 A1 * | 12/2004 | Freedman et al. | 705/1 |
| 2005/0131830 A1 * | 6/2005 | Juarez et al. | 705/51 |
| 2005/0137928 A1 * | 6/2005 | Scholl et al. | 705/9 |
| 2006/0041496 A1 * | 2/2006 | Amin | 705/37 |
| 2006/0173733 A1 * | 8/2006 | Fancher | 705/13 |
| 2006/0173761 A1 * | 8/2006 | Costakis | 705/35 |
| 2006/0200503 A1 * | 9/2006 | Dosa et al. | 707/203 |
| 2006/0235732 A1 * | 10/2006 | Miller et al. | 705/7 |
| 2006/0277085 A1 * | 12/2006 | Neumann | 705/8 |
| 2006/0293934 A1 * | 12/2006 | Tsyganskiy et al. | 705/7 |
| 2007/0021996 A1 * | 1/2007 | Barnard et al. | 705/8 |
| 2007/0143451 A1 * | 6/2007 | Huth et al. | 709/220 |
| 2007/0174160 A1 * | 7/2007 | Solberg et al. | 705/35 |
| 2007/0179873 A1 * | 8/2007 | Solberg et al. | 705/35 |
| 2007/0250418 A1 * | 10/2007 | Banks et al. | 705/31 |
| 2007/0299698 A1 * | 12/2007 | Anandarao et al. | 705/4 |
| 2008/0071642 A1 * | 3/2008 | Leiba | 705/27 |
| 2008/0256510 A1 * | 10/2008 | Auerbach | 717/107 |
| 2009/0089109 A1 * | 4/2009 | Rabetge et al. | 705/7 |

* cited by examiner

CONFIGURATION OF WEB SERVICES

BACKGROUND

The present disclosure relates to data processing by digital computer, and more particularly to configuration of web services.

In general, types of computer software applications that are accessible through a network in a service-oriented architecture may be referred to as web services. Web services may provide services of a system referred to as a provider system to a system referred to as a consumer system. Some systems may be both a service provider in some contexts and a service consumer in other contexts. For example, a system may be a service provider by offering services to other systems and that system may be a service consumer by requesting services of other service providers.

To enable web services to be provided, a configuration of a web service provider and web service consumer may need to be performed. In an application landscape including many web services, many details of web service providers and consumers may need to be configured. Configuration of web services may require technical knowledge of a specific system landscape, details of specific web services, and other information and the configuration process may require technical knowledge of how the components of the landscape work.

SUMMARY

The subject matter disclosed herein provides methods and apparatus, including computer program products, that implement techniques related to configuration of web services.

In one, general aspect, first data is received characterizing web service calls for an application and a placeholder destination for the web service calls; second data is received characterizing an identification of the system to be mapped to the placeholder; and a configuration is generated for proxy objects for the web service calls, where the configuration includes the system for their configuration instead of the placeholder destination. The placeholder destination is a placeholder for a system, where the system is to be identified for the web service calls during configuration of proxies for the web service calls and the system is not identifiable during a design-time of the application.

In a related aspect, first data is received characterizing web service calls for an application and a placeholder destination for the web service calls; second data is received characterizing an identification of a system to be mapped to the placeholder; and a configuration is generated for proxy objects for the web service calls, where the configuration includes a system for their configuration instead of the placeholder destination.

In a related aspect, data is received characterizing web service calls for an application, a placeholder destination for the web service calls, and an identification of a system to be mapped to the placeholder; and a configuration is generated for the web service calls, where the configuration maps the placeholder destination to the system.

The subject matter may be implemented as, for example, computer program products (e.g., as source code or compiled code tangibly embodied in computer-readable media), computer-implemented methods, and systems.

Variations may include one or more of the following features.

A system may be a physical system. A system may be in a system landscape directory, which may, for example, be an underlying directory of systems in an enterprise. A system may act as a provider system, a consumer system, or both.

An application may be a component of a larger application. A placeholder destination may be a placeholder for a destination not being uniquely identifiable during design-time of the application.

Web service calls may be in a group of web service calls having a common placeholder destination.

A system may be addressed by a network address, a component at the network address, or both.

Receiving data and generating a configuration may be performed during a business configuration phase of a system landscape. During a technical configuration phase of the system landscape, the system may be added to the system landscape at a services registry of the system landscape.

Generating a configuration may include applying a first profile to generate a mapping of settings for the configuration. An indication of a second profile to apply to the configuration of the proxy objects may be received. The second profile may be applied to generate an updated version of the configuration if (e.g., at a point in time where) the configuration is not being used by the proxy objects.

Data characterizing web service calls may include a list of consumer proxy identifiers.

A selection of an application to be activated may be received as part of a business process. One or more systems that provide web services to respond to the web service calls may be searched for, where the searching is based at least in part on one or more of web service descriptions and web service classifications. A user interface may be provided to display systems and allow for a selection of a system to be mapped to a placeholder, where systems may be listed in response to a selection of an application to be activated.

The subject matter described herein can be implemented to realize one or more of the following advantages. A combination of techniques, mechanisms, or both may simplify configuration of web services, especially in scenarios involving many web services such that configuration may be considered a simple, mass configuration of web services. To simplify configuration by avoiding redundant and duplicated input of configuration settings of a customer that implements a system landscape, configuration settings of web services may be applied consistently across multiple web proxy objects, web services, systems, and the like. For example, a same set of configuration settings, such as settings relating to a security policy, may be applied to configurations of proxy objects that call web services of a same provider system. As another example, a security policy may be configured for one domain of systems in a system landscape, and the security policy may be applied consistently across the systems. A services registry may act as a mediator between service consumer and service provider systems during a configuration phase, and may be a central point of entry for causing settings to be implemented. A mass configuration of web services, such as by using a same security profile for multiple web services or by grouping settings for a set of web service calls to a same service provider system, may reduce inconsistencies in the configuration of web services used by a same application. By grouping configuration, instead of providing independent, individual web service configuration, transparency of the web service configuration may be improved, a consistent change management process may be provided when a reaction to changes in the system landscape or in business processes is necessary, and effort for configuring web services and their proxies may be reduced. Configuration of web services may be split into technical and business configurations such that a context of a business process is less likely to be lost during configuration, and a business administrator need not be familiar with technical details of a system landscape or system configuration to activate an application representing a business process.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
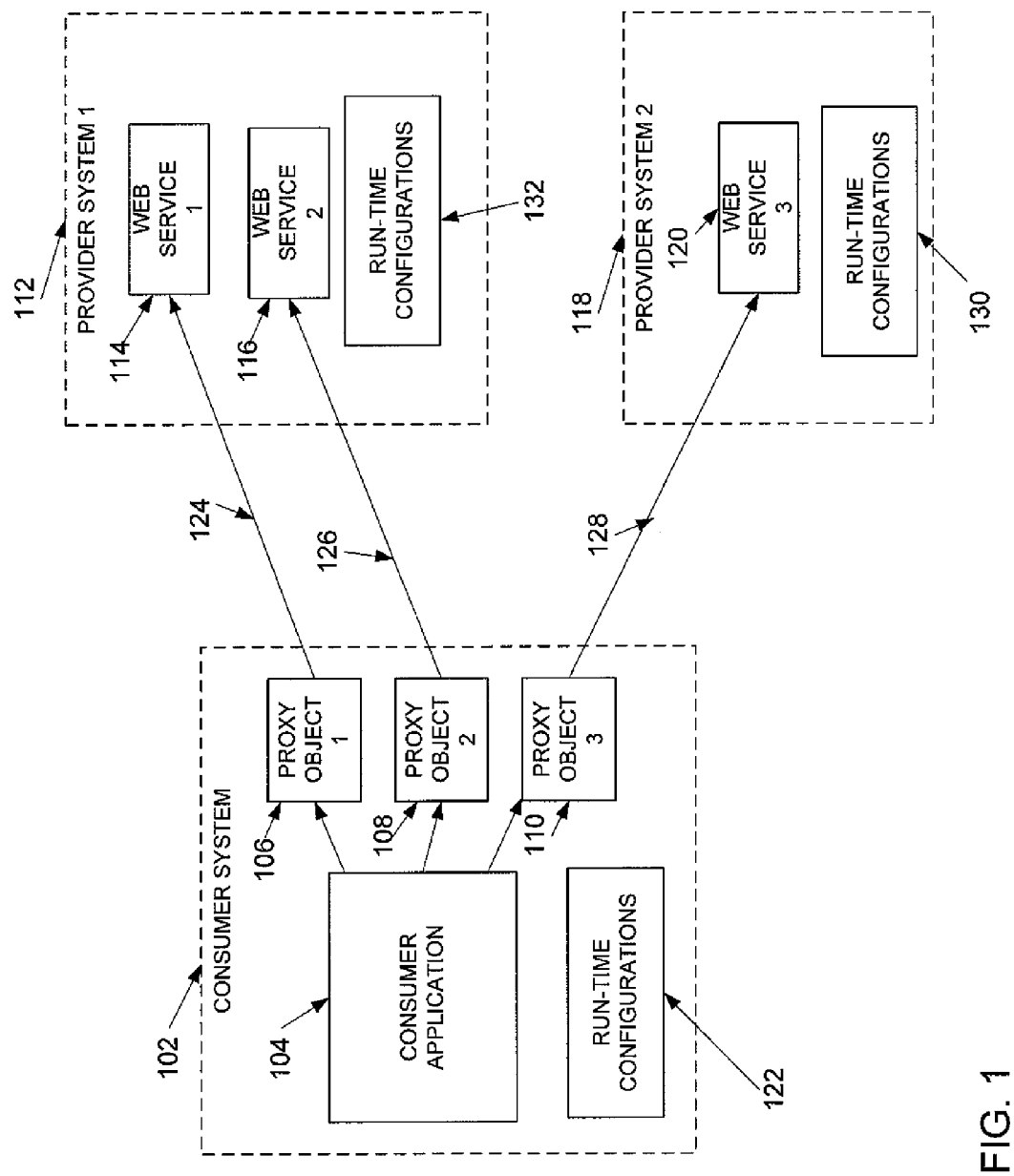
FIG. 1 is a block diagram of a system landscape of consumer and provider systems to communicate through web service calls at run-time.

In general, a separation of phases of development or deployment of systems described in the following description may include design-time, technical configuration time, business configuration time, and run-time. In general, design-time may refer to a development of web services or applications that use web services, such as source code programming of an application that uses web services. Technical configuration time may refer to configuration of a deployed application at a level which removes technical details from requiring further configuration, and does not involve activation of web services. For example, technical configuration may involve selecting systems, configuring systems, selecting policies, and configuring policies that may hold for all web services between the selected systems (e.g., all systems of a configuration domain in which systems are selected to be a part). Technical configuration may be performed by a technical administrator. In contrast to technical configuration, business configuration may refer to configuration of a deployed application and web services, which may be at a level at which extensive technical knowledge is not required. For example, business configuration may be performed by a business administrator who has knowledge of business process modeling but has limited technical knowledge related to configuring systems in a system landscape.

In general, a distinction between technical configuration and business configuration may be further described as follows. During technical configuration a system landscape may only be prepared for configuration of web services. This preparation may be independent of web services that might get configured between the systems of a system landscape later (during a business configuration). Thus, a technical administrator might not know anything about concrete web services. He or she may only deal with systems, policies and the like, but not with web services. During a technical configuration only technical web services necessary for configuration, itself, may be capable of running and web services for a business process might not be capable of being activated.

During a business configuration a business administrator may decide whether a concrete web service shall be activated. In some cases, he or she is not even aware of web services, and may enable a business process (that results in activating its web services). But in some cases the business administrator may need to select a system which shall provide a web service. And, in any case a business configuration may result in a configuration of web services, a configuration of consumer proxies for web services, or a configuration of both.

A business configuration uses results from a technical configuration. On the other hand, a technical configuration might not use results from a business configuration. Therefore, a first technical configuration takes place before a beginning of a first business configuration.

Technical configuration should determine as much settings as possible, which are independent of specific web services, leaving remaining configuration to be performed in a business configuration.

Run-time may refer to a run-time version of a system landscape where a deployed and configured application may use web services activated by a business administrator during the business configuration phase. A user who interacts with a run-time phase may be referred to as a business user.

FIG. 1 is a block diagram of a system landscape 100 of consumer and provider systems 102, 112, 118 to communicate through web service calls 124, 126, 128 at run-time. In general, the consumer system 102 may include a consumer application 104 that may consume web services through web service calls 124, 126, 128 with the use of proxy objects 106, 108, 110 and run-time configurations 122. The provider systems 112, 118 offer web services 114, 116, 120 for use by the consumer application 104 in response to the web service calls 124, 126, 128.

The web service calls 124, 126, 128 may be performed by the proxy objects 106, 108, 110, as the proxy objects 106, 108, 110 may provide an interface for the consumer application 104 such that the consumer application 104 need only have an identification of a proxy object to call to initiate a web service call. Due to a separation between the application 104 and the proxy objects 106, 108, 110, for example, a run-time configuration of a first proxy object 106 may change to reflect changes to a policy for performing a web service call without having to change the consumer application 104.

The proxy objects 106, 108, 110 are configured during a configuration time phase and might be included in a deployment of the consumer application 104. The configuration may be performed during a configuration time phase due to details of a specific system landscape not being known during design-time such that configuration of parameters might need to be performed after deployment. For example, a destination of a web service call, which might be a network address being a uniform resource identifier including an internet protocol address of a provider system and a name of a component at the provider system, might not be known during design-time and may need to be determined during configuration-time for the proxy objects 106, 108, 110.

Consumer proxies may be object classes (for example implemented in ABAP (ADVANCED BUSINESS APPLICATION PROGRAMMING) or JAVA). Consumer proxies may be generic or generated. Configuration both kinds of consumer proxies may be treated in the same way, with differences being only in how they are created in a design-time phase. A generation of consumer proxies may take place during the development (design-time phase)—not during configuration in the customer system. During a business configuration phase (e.g., in a customer system) a consumer proxy may get one or more run-time configurations, each of which are collections of settings. There may be several run-time configurations for one and a same proxy, as a run-time configuration may be specific for one provider system (e.g., a same proxy may be used for multiple provider systems using different run-time configurations).

When a consumer proxy is used for an invocation of a web service in an application program, a run-time instance of the consumer proxy object class may be instantiated with reference to one of its run-time configurations. For example, the first proxy object 106 may have a reference to a first run-time configuration that may be one of multiple run-time configurations in the run-time configurations 122.

In general, the consumer application 104 may implement part of a business process that is performed in concert by the consumer application 104 and the provider systems 112, 118. For example, the consumer application 104 may implement a business process related to order processing where the consumer application 104 calls a first web service 114 to add a customer to a customer database if the customer does not yet exist; and the consumer application 104 calls a second web service 116 to add the order to an order database; and the consumer application 104 calls a third web service 120 to cause a receipt to be generated for the order.

Run-time configurations 122 include a configuration of parameters to be used by the consumer system 102 during run-time. The run-time configurations 122 may include a collection of multiple run-time configurations to be used by the proxy objects 106, 108, 110, where there may be one or more run-time configurations for each of the proxy objects 106, 108, 110 and a run-time configuration may be specific to a proxy object of a provider system. The proxy objects 106, 108, 110 might not share run-time configurations and a proxy object may have different run-time configurations for different provider systems.

A run-time configuration in the consumer system 102 may be used by the consumer proxy objects 106, 108, 110 when making a web service call. For example, for the invocation of a specific web service a run-time configuration for a corresponding consumer proxy may contain a Uniform Resource Locator (URL) that will be used for the invocation.

Each of the provider systems 112, 118 include run-time configurations 132, 130, and each of the run-time configurations 132, 130 may be a collection of run-time configurations for web services in the respective provider systems 112, 118.

In a provider system, such as one of the provider systems 112, 118, run-time configurations of a web service may describe a way in which the provider systems 112, 118 accept invocations of the web service and how it will behave during the invocation. For example, a run-time configuration of a specific web service may describe a type of authentication that is accepted for invocations of that web service, that all calls are stateful, and a session cookie to be used to identify the sessions for stateful processing.

A run-time configuration for a web service may be derived from design-time attributes of the web service, policies in an applied configuration profile (profiles are discussed in more detail below), or both.

A run-time configuration for a consumer proxy may be derived from a combination of one or more of a technical description of a corresponding web service (e.g., a Web Services Description Language (WSDL) file containing a URL for an invocation of the web service), settings for a destination (e.g., a user identifier and password of a destination template), settings in a profile referenced in the destination (the relevant settings may already be contained in the technical description of the web service), and design-time attributes of the consumer proxy (e.g., rules on how to interpret a WSDL file of a web service).

Figure 2:
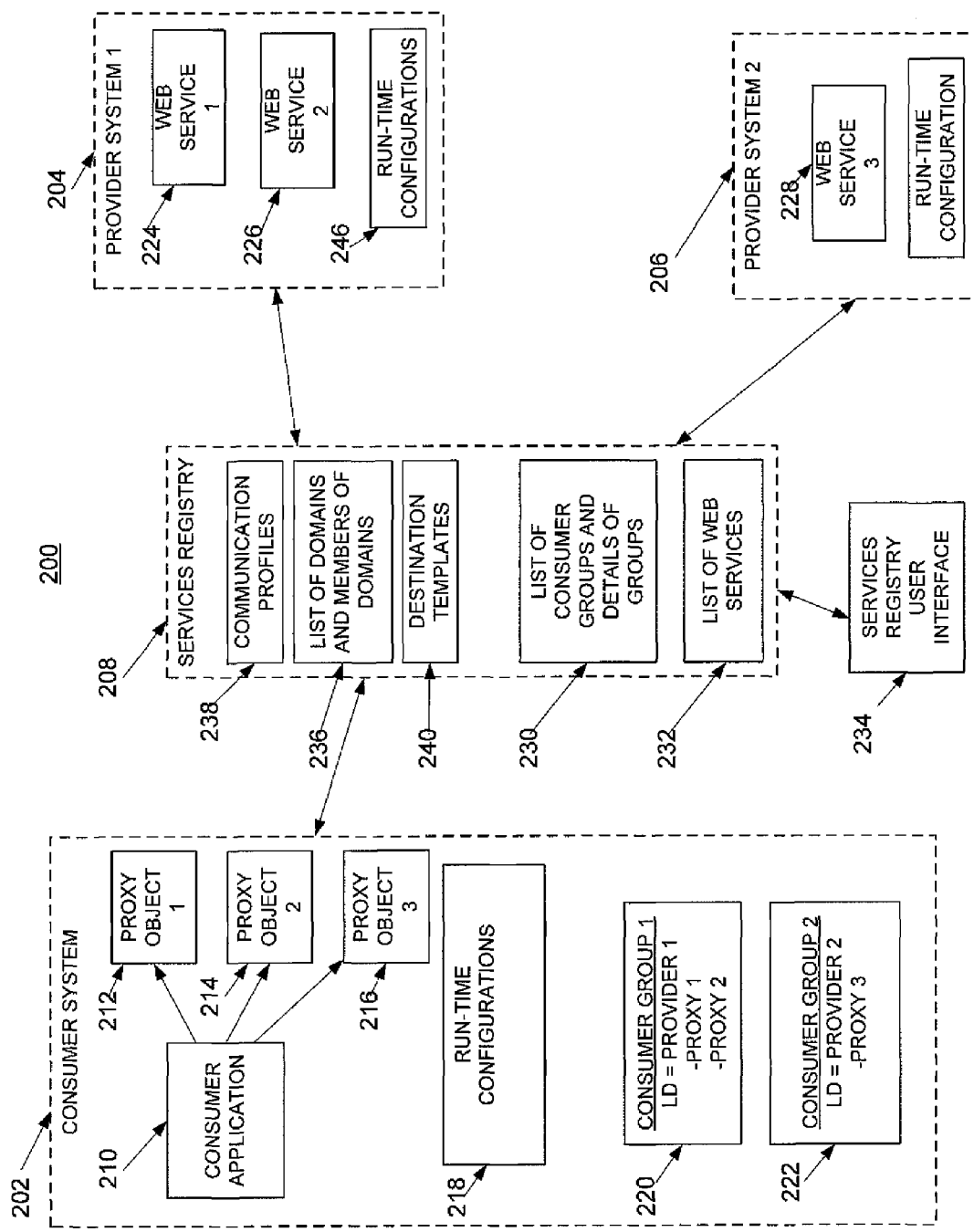
FIG. 2 is a block diagram of a system landscape of consumer and provider systems to interact with a services registry at configuration time.

FIG. 2 is a block diagram of a system landscape 200 of consumer and provider systems 202, 204, 206 to interact with a services registry 208 at configuration time. In general, configuration time may be split into two types of configuration phases, a technical configuration phase performed by a technical administrator and a business configuration phase performed by a business administrator. Configuration time may involve taking a set of consumer and provider systems 202, 204, 206, and configuring them with assistance of the services registry 208 such that the consumer and provider systems 202, 204, 206 may interact during run-time. For example, a combination of settings might not be set for consumer system 202 during design-time and those settings may need to be chosen during configuration time such that components of the consumer system 202 may operate properly (e.g., such that web service calls may be made to an appropriate provider system in accordance with desired security settings). During run-time, the consumer system 202 and the provider systems 204, 206 may interact as the consumer system 102 and the provider systems 112, 118 of the system landscape 100 interact with reference to FIG. 1.

As discussed above, a configuration phase may be required as details of a system landscape of deployed systems might not be known during design-time of components of the system landscape. As examples, host names (e.g., a name of a web service provider assigned to a system in a system landscape directory or a technical, network address of a web service provider); account management details for users of the system landscape (e.g., logon procedures, user identifiers and passwords, and the like); a distribution of deployment units in the system landscape; security policies of a system landscape to be specified in a deployment (e.g. a customer may wish to only use HyperText Transfer Protocol over Secure Socket Layer (HTTPS) for communications between systems in a system landscape); and the like.

In addition to details of a system landscape not being known during design-time, control over portions of the system landscape may be desired to be left until a deployment. As examples, control of opening of inbound interfaces, activation of calls to web services (including web services external to a system landscape), and a wide area network-connection inside a system landscape may be left until deployment. Before the business configuration in a service provider system none of its web services may be called (with an exception of some technical web services that may always be necessary, such as web services used during the web service configuration itself).

Control of opening of inbound interfaces may refer to a business administrator keeping control over a set of "open inbound interfaces" (e.g., callable web services), as he or she may decide which business processes are established and which are not. During business configuration, run-time configuration may be generated only for those web services which are part of business processes a business administrator wants to enable. If a web service is provided by a system, there remains a risk that it might get misused. By making sure that only those web services are provided that are part of a business process, the risk of misuse may be minimized.

Technical configuration may involve adding a system to the system landscape 200 such that the added system is visible to the services registry 208, the services registry 208 has information about the added system, and the services registry 208 may interact with the added system. Each of the systems in the landscape 200, such as the consumer and provider systems 202, 204, 206 is a technical system in the sense of a system of a system landscape directory. A system, which is relevant for web service configuration, may be identified by its database instance. In a client-server environment, several application servers (providing their processors for calculations) may share a same database instance such that they behave like one system, although they may, for example, have different Internet Protocol addresses. Architecture of a system landscape may be "client-enabled", such that it may allow for splitting of an amount of business data into several "clients" that are completely separate from a business point of view. Thus, from a web service configuration perspective, each "client" in a database instance may be a system of its own.

As part of adding a system to the system landscape 200, the services registry 208 may maintain a reference to the system in a list of systems. The reference to the system may be an identifier of the system taken from a system landscape directory (identifying a client in a database instance). In addition to maintaining a reference to the system, the services registry 208 may store for each system parameters of a web service connection to that system.

In addition to adding a system to a list of systems, information from a system may be published in the services registry 208. Information published in the services registry 208 may include a list of what may be referred to as consumer groups of a consumer system; a list of services, including descriptions of those services and other design-time attributes of those services, offered by a system that acts as a provider system; and physical descriptions of a system. As an example, the consumer groups 220, 222 may be published by the consumer system 202 to the services registry 208 and stored in the repository 230 of a list of consumer groups and details of the consumer groups. As another example, and each of the provider systems 204, 206 may publish descriptions of the web services 224, 226, 228 to the services registry 208, for which a reference may be stored in the repository 232 of the list of web services. A reference to a description of web services 224, 226, 228 may be, as an example, a URL referring to a web service description. The description of web services may be referred to as service descriptions, and each service description may include a set of documents that describe an interface to and semantics of a service (e.g., a list of methods for invoking the service, a list of parameters required for the methods, a list of types of results returned by calling a method of a service, and the like) and the service description may be in a format, such as a format in accordance with WSDL. In variations, service descriptions may be stored instead of a reference to a service description.

Design-time attributes of a web service may include one or more of a service definition name (which may be a name of a design-time part of a web service in a development environment), a qualified name of a port type (which may identify an interface of a web service independent of an implementing programming language), an identifier of the provider system of the web service in a system landscape directory, and classification information of the development object of the web service (which may include classification values such as values describing a deployment unit and process component to which a web service belongs). The classification information may be in accordance with the Universal Description, Discovery and Integration (UDDI) standard, and classification information may include a combination of an identification of a classification taxonomy and classification codes for a web service. The design-time attributes may be included in the service description.

Classification information for consumer groups may also be published to the services registry 208 and that information may also be in accordance with UDDI.

In addition to adding design-time attributes of services to the services registry 208, attributes of configured web services may be added to the services registry 208 during configuration time (e.g., during a business configuration). These attributes may include one or more of a qualified name of the service from a service description (e.g., in a WSDL document), a qualified name of a binding/endpoint in the service description (e.g., in a WSDL document), and a URL for an invocation of the configured web service.

As part of adding a system to the system landscape 200, a destination template may be generated for each system that acts as a provider system. For example, a destination template may be generated for each of the first provider system 204 and the second provider system 206, and the destination template may be stored at the registry 208 in a repository 240 of destination templates. The destination template may describe access into a system and may be used for configuration of consumer proxies. For example, a destination template may contain properties of a destination that may be stored as part of a run-time configuration of a consumer application, such as in one of the run-time configurations 218. During business configuration in a consumer system a consumer group may be configured for one or more destination templates. In such a scenario, the destination templates may point to different provider systems (e.g., they may be required to point to different provider systems when a same consumer group is configured for multiple destination templates) and the provider systems must be compatible with a placeholder destination, which may be referred to as a logical destination, of the consumer group. The configuration of the consumer group may result in run-time configurations for its consumer proxies. For each of these run-time configurations knowledge may be kept about which consumer group and which provider system a run-time configuration has been generated.

A destination template may only contain information about a provider system that may be independent of web services offered by that provider system. For example, a destination template may contain a user identifier and password that may be used for the invocation of web services which require this kind of authentication. If a web service does not require any authentication at all, then a run-time configuration of its consumer proxy might not contain a user identifier and password. A run-time configuration of a consumer proxy may include a URL used to invoke a web service. As this URL is web service specific, it might not be contained in a destination template, but in a service description of the web service.

In addition to adding a system to the system landscape 200, a system may be added to a configuration domain, which may be referred to as a "domain." A domain may define a group of systems assigned to the domain, where the domain has a communication profile that describes one or more security policies for systems in the domain to be used while communicating with other systems in the domain. For example, the consumer and provider systems 202, 204, 206 may be assigned in a technical configuration phase to a same domain, where the domain has a profile prescribing a policy that the systems in the domain communicate using HTTPS. In accordance with that profile, the consumer system 202 may send web service calls using HTTPS to the provider systems 204, 206. In particular, proxy objects that send web service calls may implement and use the HTTPS protocol when making web service calls.

The profile of a configuration domain may contain security settings and non-security settings. Security settings included in a configuration domain may include, as an example, a set of admissible authentication techniques for a web service connection between systems of the domain (e.g. HyperText Transfer Protocol (HTTP) basic authentication with a user identification and password, a Security Assertion Markup Language (SAML) assertion, a digital certificate (e.g., in accordance with X.509), and the like). Non-security settings may include, as examples, several timeout parameters (e.g., for a WS-RM protocol), decisions about a mechanism used for stateful web services (e.g., HTTP cookie or URL-rewriting), and the like. Additionally, a profile may further include default settings for destination templates of a domain, such as a hostname and HTTP port of an HTTP proxy server for remote connections.

Systems may be added to one or more domains, such that a system may adhere to different policies for different interactions with other systems in a same domain. Where multiple systems are members of a set of same, multiple domains a rule may determine a profile to which the systems adhere. For example, if two systems are members of a same two domains, a rule may indicate that a profile of the domain having the strictest security policies is to be adhered to by the two systems when the two systems communicate with each other (e.g., when one systems requests services from the other) and a technique may have ways of determining which security policies are stronger (e.g., encryption strength having a larger number of bits may be considered stronger). As another example, policies may have associated rankings such that there is a rank order among domains and a rule may dictate that for a connection between two systems that share multiple domains, a policy with the highest ranking is to be applied. Ranks of policies may be assigned by a technical system administrator and the services registry 208 or the consumer system 202 may store ranking information to make a determination as to a policy to apply.

Information related to domains may be stored at the services registry 208. For example, a list of domains and members of domains may be stored in a repository 236 of a list of domains and members of domains, and profiles for domains may be stored in the repository 238 of communication profiles at the services registry 208.

Profiles of a domain may be distributed to consumer and provider systems 202, 204, 206 such that policies of a profile may be implemented in a run-time configuration of the systems. For example a profile of a domain including the consumer system 202 and the first provider system 204 may be stored at the repository 238 of communication profiles, and that profile may be distributed to the consumer system 202 and the first provider system 204 for inclusion in the run-time configurations 218, 246. Distribution of profiles might not occur until a business administrator initiates configuration of systems in the system landscape 200.

In addition to having a profile for a domain, default settings of destination templates may be added to a domain and there may be default destination template settings (e.g., hostname and HTTP-port of a HTTP-proxy-server for remote connections) established for each system in the domain that may act as a provider system.

In contrast to a technical configuration phase that may focus on adding systems and related information to the services registry 208, a business configuration phase may focus on selecting web services to be used for one or more business processes. The selection of web services may result in triggering configuration of the selected web services and consumer proxies for the selected web services. For example, while a technical configuration phase may result in a combination of systems being added to the system landscape 200 with domains being set-up, destination templates being configured, profiles being configured, profiles being associated with domains, and the like, a run-time configuration of consumer and provider systems might not be generated until a business configuration phase. With this separation, a technical configuration phase need not take into account any business processes to be implemented in a business configuration phase. For example, during the technical configuration phase, systems may be added to domains based on considerations other than an implementation of a business process.

To determine which web services need to be used for one or more business processes, consumer groups of an application may be used in combination with a classification of web services. The process of determining web services may be as follows. When a web service is published in the services registry 208, it may also be classified according to an application area to which it belongs (e.g., based on classification information published to the services registry 208). From this classification, the services registry 208 may derive a classification of provider systems according to the application areas for which they provide web services. In the consumer system 202, all web services consumed by an application are grouped into consumer groups 220, 222 and each of the consumer groups 220, 222 references a logical destination. The logical destination may describe an application area that the consumer group expects in the provider system (e.g., a name of a logical destination may be the description of the application area or a logical destination may have attributes describing the application area). Each logical destination may be mapped onto a value of an application-area-classification of provider systems in the services registry 208. When a consumer group has to be configured, at first a logical destination of the consumer group may be used to get a set of provider system candidates. Then, each of these candidates may be checked to see whether it provides all web services requested by the entries of the consumer group.

If there is a classification for web services in the registry 208 according to an industry-specific extension, then this classification may also be used for the determination of the web services to be consumed. For example, a consumer group may contain information about an extension it requests, and the classification of web services may be used for the selection of possible provider systems.

Classification information in the services registry 208 may also support a search for consumer groups belonging to a (consumer) application. For example, there may be a classification of consumer groups in the services registry 208 according to an application to which the consumer group belongs.

For example, the repository 230 having a list of consumer groups and details of consumer groups may be used to list web services associated with an application that implement part of a business process. A business administrator may select the application as an application to be activated, may select destination templates for the web services of the consumer groups associated with the application, and, the services registry 208 may trigger configuration of the web services, consumer applications, and configuration of consumer proxies of the application. For example, the services registry 208 may cause the run-time configurations 218 of the proxy objects 212, 214, 216 to be generated.

As another example, the consumer application 210 may implement a business process such that configuration of the consumer system 202 and web services called by the consumer application 210 may result in configuration of all systems of the business process. Thus, consumer groups of an application may list all necessary consumer proxies and web services to be configured for a business process. For example, the consumer groups 220, 222 may include a listing of consumer proxy identifiers, which may be used to determine which consumer proxies need to be configured, and the consumer proxies may be used to determine types of web services that are called by an application. Based on the type of web services that are called by an application, a mapping of a placeholder destination of a consumer group to a physical destination may determine specific web services that are to be configured for being called by the consumer proxies. The identification of consumer proxies and determination of web services that are called by consumer proxies may determine all consumer proxies and web services that need to be configured for a business process.

In general, in a business configuration phase a business administrator might not be informed of domains of systems, but may be informed of names and roles of the systems of the system landscape 200. For example, a business administrator may be aware that the consumer system 202 has applications the business administrator desires to activate, and the business administrator may select that system through the services registry user interface 234 for activation. In response to that selection, the services registry 208 may send to the services registry user interface 234 a list of systems that may interface with the selected system to provide web services (e.g., the services registry 208 may use a list of consumer groups to build a list of possible provider systems in a same domain as a selected consumer system, and a business administrator may select one or more provider systems to activate, which may cause configuration of those systems).

As described above, the services registry 208 stores a variety of information related to the service consumer and service provider systems 202, 204, 206. In this role, the services registry 208 may act as a central repository for storage and distribution of information related to services in the system landscape 200, in addition to assisting configuration of components of the system landscape 200. To assist configuration of components of the system landscape 200, when a system is added to the services registry 208, the services registry 208 may have services for communicating with components. For example, the system registry 208 may have a service to assist in generating the run-time configurations 218 at the consumer system 202.

Management of the services registry 208 may be provided through a services registry user interface 234. For example, both a technical and business administrator may use the services registry user interface 234 to configure components of the system landscape 200 through the services registry 208, as described above. For example, a business administrator may select an application and web services consumed by the application to be activated and the services registry 208 may cause configuration of the application and the web services (e.g., by generating run-time configurations for consumer proxies for the application).

In addition to managing addition of systems and configuration of systems, the services registry 208 may manage changes in the system landscape 200. Changes may include, as examples, removal of a system from the system landscape 200, removal of a system from a domain, removal of a domain, modifying a security profile of a domain, and the like.

As an example of how a security profile may be modified, a user of the services registry 208 may make modifications to an existing profile or select another profile to replace an existing profile for a set of systems (e.g., for a set of systems in a domain). The new profile may be distributed to consumer and provider systems, and a new run-time configuration may be generated for consumer and provider systems. If a consumer system is not communicating with an older profile or old run-time configuration, the old profile and old run-time configuration may be replaced with new versions based on the new profile.

As components of some consumer systems may be communicating using the older profile and the old run-time configuration, those components may be allowed to continue communicating using the older profile while the new profile may be used for other components that are not communicating with the older profile (e.g., the old profile may be used in parallel with the new profile). For example, while some proxy objects continue to communicate with an older profile and older run-time configuration, other proxy objects may communicate with the new profile and new run-time configuration. If a component that was communicating with the older profile stops communicating with an older profile (e.g., a conversation ends), the new profile may be activated for that component. This may continue until all components of a consumer system no longer use the old profile. Then, the old profile and old run-time configuration may be deleted in lieu of the new profile and new run-time configuration. Determining whether an old version of a profile is used by a consumer system may be performed by a consumer system itself.

As an example, if an old version of a profile is used for simple, stateless, synchronous calls, a new version may be applied for a next, following call. As another example, if a profile is used in a stateful connection or in a sequence, such as a Web Services ReliableMessaging (WS-RM) sequence, a wait may be performed for completion of all open sequences if a modification of the profile is not ensured to not affect settings of the sequence.

If all consumer systems in a domain no longer have the older profile, the old profile may be deleted from all provider systems. In this fashion, profiles may be updated without adversely affecting web services using an older version of a profile (e.g., web service connections need not be dropped). In addition, the change process may run completely automatically as the change process may be controlled by the services registry 208 (e.g., by requesting adoption of an updated profile at a consumer or provider system). If a system requires human-involvement to set a new profile, service providers and service consumers may automatically be included in the process by automatically generated e-mails to human administrators containing deadlines for completion of their change management tasks.

Removing a system from a domain may include a technical administrator selecting a system to remove from a domain and the services registry 208 removing an association between a system and a domain. If a system to be removed is a provider system and the provider system is a member of other domains, a determination may be made as to remaining domains that may be in common with consumer systems that are configured to interact with the provider system. Profiles of other domains may be used for a configuration of interactions between the provider system and the consumer systems that are configured to interact with the provider system. In some implementations or deployments, there may be a "global" domain, which contains all systems of a system landscape and which has a lowest preference. The policies of this domain may describe a "least common denominator" of conventions for web service connections. In such a scenario, a domain may always be available for connections.

If a system to be removed is a provider system and the provider system is not a member of other domains, the services registry 208 may remove destination information related to a system. Removing destination information related to a system may include removing a destination template at the services registry 208. Another system may be used to replace the removed system, which may involve searching repositories of the services registry 208 for systems that can replace the system (e.g., if a provider system is removed, searching for other destinations), and configuring a replacement. For example, if a system that is removed is a provider system, a provider system that may perform services for consumer systems may be searched and destination information for a replacement provider system may be distributed to the consumer systems. For example, a domain may be searched for replacement provider systems which may have classification information and service descriptions that match services needed for consumer systems that used the removed system.

The consumer groups 220, 222 are developed during design-time and shipped with an application that acts as a consumer. For example, the consumer groups 220, 222 may have been developed and shipped with the consumer application 210. Development of a consumer group may be performed manually through a text editor. In general, a consumer group contains a placeholder destination of a provider system and a group of service calls to the provider system from a consumer application. Thus, development of a consumer group may include naming a placeholder destination and making a list of web service calls an application makes to the placeholder destination. Web service calls may be identified in a consumer group by a consumer proxy identifier, which may be an identifier that references a proxy object that can be used to make a web service call to a destination. Thus, a placeholder destination and a collection of proxy identifiers may make up a consumer group.

The placeholder destination may be referred to as a logical destination, which may be a name of a destination that is used during design-time but does not correspond to a system of a system landscape during run-time. In this manner, the logical destination may be used to refer to a destination for which a name or information about which is not available, as information about the destination might not be available until configuration time (e.g., at a customer system landscape, such as the landscape 200). Thus, the name may be used, at design-time, to consistently refer to a destination that has yet to be identified which may simplify design and configuration of an application and web services the application calls. For example, as a single name may be used to refer to a destination in multiple web service calls, the configuration of a system landscape may consistently cause that name to be mapped to a destination of a system landscape at configuration time.

A destination to which a logical destination is to be mapped may be a component of a system at which a web service call may be received and serviced. The destination may be represented by what may be referred to as a destination template, such as one of the destination templates 240. A destination template, as described above, may describe how to access a specific provider system (e.g., an actual destination) from the consumer system. The destination template may include one or more of logon information (such as a user identification and password) used for invocation of web services in the provider system; a URL for a Web Service Inspection Language (WSIL) document that contains information about every web service offered by the provider system and may be used if no services registry (such as the services registry 208) is available; logon information to access metadata about one or more web services offered by the provider system (which may be used to retrieve a service description document with a URL that has been found in a services registry or in the document offered by the WSIL service of the provider system); a reference to a configuration profile (e.g., including a profile version); and configuration parameters used in a consumer system (e.g., a hostname and HTTP-port of an HTTP proxy server (a configuration profile may contain default values of these configuration parameters valid for all destination templates of its configuration domain).

The mapping of a logical destination to a destination template of a system landscape may be performed during a business configuration phase. For example, in response to a business administrator selecting a provider system to be configured for a consumer system, destination information related to the provider system may be used to generate settings of a run-time configuration at a consumer system and that run-time configuration may be used by a proxy object of a consumer application to make a web service call to a component of the provider system.

As discussed above, a run-time configuration may be generated as part of a configuration phase, and, in particular, as a result of a business configuration phase. In addition to including destination information, a run-time configuration, such as one of the run-time configurations 218 of the consumer system 202, may include other parameters to assist with making web service calls. A run-time configuration of a web service of a provider system may be based on a combination of design-time properties of a web service (e.g., design-time properties of a provider system service may be transposed to a run-time configuration at a provider system), policies in a security profile (e.g., a security profile of a domain), rules deployed with a web service, and the like. A service provider may have multiple run-time configurations, including different run-time configurations for different security profiles (e.g., for different domains) and different versions of a security profile (e.g., older versus newer security profiles). A run-time configuration of a consumer proxy of a consumer system may be based on design-time properties of the consumer proxy, security policies of a web service destination, additional settings for the provider system in the web service destination, a service description for a web service, and rules deployed with a consumer application.

In general, the generation of run-time configurations for a web service takes place in its provider system. For example, the run-time configurations 246 of the first provider system 204 may be generated at the first provider system 204. To be callable, a web service may need at least one run-time configuration. There may be several run-time configurations for a web service. For example, the first web service 224 of the first provider system 204 may have multiple run-time configurations stored in the run-time configurations 246. Each of the run-time configurations may correspond to, for example, different settings used when being called by different consumer proxies of different domains. A URL used for an invocation of a web service may specify a run-time configuration to be used.

A run-time configuration of a web service may be generated from a combination of design-time attributes of the web service and a configuration profile of a configuration domain of which a provider system is a member. Rules used to derive a run-time configuration may be specific to a certain technical kind of web service and might not be changed by configuration in a deployed system (e.g., a customer system). Thus, reference to applicable rules may be part of design-time attributes of a web service.

Examples of settings derived from design-time attributes and a configuration profile may include session state settings, timeout settings, HTTP settings, and security settings. Those settings may become part of a run-time configuration of a web service at a provider system.

For example, in general, web service calls may be stateless. Thus, if a web service is called several times, execution of the calls occurs independent of each other, even if the calls are from a same application run-time context. Settings for stateless calls may be part of design-time attributes that become part of a run-time configuration.

Web service calls may also be stateful. For such a scenario, there may be a design-time attribute of a web service that activates stateful processing of the web service. After the processing of a web service call a run-time environment of stateful calls may be kept for future calls from the same application run-time context. Two alternative technologies for stateful web service calls may include cookies and URL re-writing. As a web service behavior may be different depending on a chosen technology, a technical administrator may decide which technology to be used. Activation of stateful processing may be a design-time attribute of the web service, a configuration profile may contain an entry that indicates which technology to be used for stateful calls between systems of a corresponding configuration domain, and a run-time configuration setting may depend on a combination of the design-time attribute and the configuration profile entry. If stateful processing is activated, then a technology chosen in a configuration profile may be applied to a run-time configuration setting.

As another example, there may be several timeout values that control reliable processing of a web service according to a standard WS-RM that may be part of run-time configuration settings. A combination of design-time attributes and attributes of a configuration profile may be used for configuration of WS-RM. As examples, design-time attributes may specify which web service operations are processed according to WS-RM and a configuration profile may include corresponding timeout values. Generating run-time configuration settings may include, if design-time settings indicate that WS-RM processing was activated, timeout values. Otherwise, for example, no timeout settings may be included in a run-time configuration.

As another example, HTTP settings may be part of settings of a configuration profile. For example, a configuration profile may contain entries about an HTTP proxy host and a corresponding HTTP port that are used as default settings for corresponding settings in destination templates referencing a version of the configuration profile. However, these settings may have no effect on a run-time configuration of a web service provider.

As another example, there may be security settings from design-time attributes and a configuration profile that may become part of a run-time configuration. For example, there may be several techniques available for transmission security and authentication of a user consuming a web service (e.g. HTTP basic authentication with user-ID and password, SAML assertions, or X.509). A configuration profile may describe a subset of authentication techniques that are allowed for web service invocations between systems of a configuration domain. As security requirements may be different for different web services, some web services might not need any kind of authentication technique, while others may need a strong authentication technique. A minimal authentication level may be a design-time attribute of each web service with possible values such as "none", "basic" and "strong". For transmission security there may be another design-time attribute with possible values such as "none" and "both" (e.g., for confidential transmission and integrity)). Security preferences of a web service may be set as design-time attributes.

For example, if w1 is a web service that requires neither authentication nor transmission security, w2 is a web service that requires at least basic authentication, and w3 is a web service that requires a strong technique of authentication, all three web services may be configured with a same configuration profile p that offers basic authentication, SAML assertions, and allows for web service calls without authentication.

As each web service may have different design-time attributes, a combination of design-time attributes and a same configuration profile may result in three different run-time configuration settings. For example, a run-time configuration of w1 may enable invocation of w1 without any authentication, a run-time configuration of w2 may enforce at least basic authentication, and a run-time configuration of w3 may enforce SAML assertions. If the configuration profile did not allow for web service invocations without authentication, then a resulting run-time configuration of w1 may enforce at least basic authentication. If the configuration profile did only allow for web service invocations with SAML assertions, then the configuration of w1, w2, and w3 may get run-time configurations that only allow for calls with this strong authentication method.

Generation of a run-time configuration for a consumer proxy may take place in a consumer system. In general, a run-time configuration of a consumer proxy may depend on content of service description of a corresponding web service (e.g., a WSDL document referred to in the services registry 208), settings of a destination template for a provider system, and a configuration profile referenced by the destination template.

Generation of a run-time configuration may include (a) retrieving URLs of service descriptions corresponding to a port type of a web service from the services registry 208 or from a WSIL document of a provider system (logon data for these metadata requests including the URL for the WSIL document may be contained in a destination template for a provider system); (b) for each URL retrieved, (i) the consumer system may try to retrieve and understand a corresponding service description (e.g., a WSDL document corresponding to a URL corresponding to a port type of a web service), (ii) try to generate a run-time configuration for the consumer proxy, and continue (i) and (ii) until a successful attempt to generate a run-time configuration.

Generation of run-time configuration for a specific service description (e.g., WSDL document) may include replacing provider properties in a service description with corresponding consumer properties for the run-time configuration, and enriching the run-time configuration with settings taken from a destination template, its referenced configuration profile, or both (e.g., enriching a run-time configuration with a user identifier and password from the destination template, the proxy host and port from the destination template, or default settings from a configuration profile).

Although the description of FIG. 2 describes technical and business configuration with respect to a technical administrator and a business administrator such that the two administrators may be two different users, that need not be the case and a split between technical and business configuration may still be beneficial. For example, by separating the technical configuration from business configuration, details of technical configuration need not cause a context of a business process being configured during business configuration to be lost, as the business configuration may be more focused towards those aspects related to activating applications of a business process than technical configurations of systems.

Figure 3:
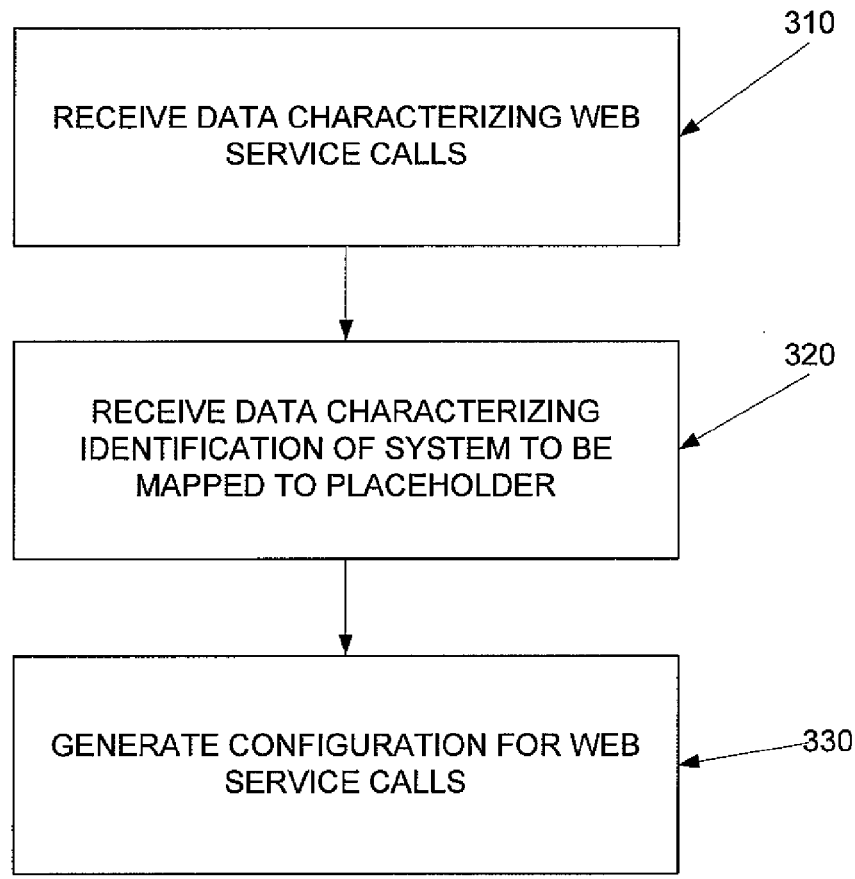
FIG. 3 is a flowchart of a process to generate a configuration for web service calls.

FIG. 3 is a flowchart of a process 300 to generate a configuration for web service calls. The process 300 may be implemented in the system landscape 200 of FIG. 2 and may be performed, for example, during a configuration phase. In general, the process involves receiving data characterizing web service calls and a placeholder destination for the web service calls (310), receiving data characterizing an identification of a system to be mapped to a placeholder of a system (320), and generating a configuration for web service calls (330).

Data characterizing web service calls and a placeholder destination for the web service calls is received (310). The data may be a consumer group, as described with reference to FIG. 2. The data characterizing the web service calls may include a list of consumer proxy identifiers to represent web service calls or another form of identifying web service calls (e.g., a name of a web service to be called). The data characterizing the placeholder destination for the web service calls may be a name that is used to consistently identify a destination to identify web service calls where the destination has not yet been identified. For example, a name "CRM-System" may be used to identify a customer relationship management system where an actual host name of a customer landscape system is not yet identifiable and the name CRM-System can not be used to address a particular system in the system landscape (e.g., as a mapping must be performed between the placeholder name, and a name or address of the actual system). The web service calls may all be developed to be from a particular application or application component such that the list may identify a list of web service calls for an application which is required to be configured for the application. Thus, the web service calls may identify all web service calls required for the application to function properly. The system to which the placeholder destination acts as a placeholder may be a physical system, such as a unique system identifiable in a system landscape directory. The system may include one or more computers (e.g., a system may be a combination of blade servers).

Data characterizing an identification of a system to be mapped to a placeholder of a system is received (320). The data may include a selection of a system from a business configuration phase. The system may be selected based on service descriptions, service classification information, or both. For example, a system may be one of many possible systems if the web services to be called in a list of web services match a system. For example, as service descriptions may be published by a provider system to a services registry, the services registry may search for service descriptions that match a list of web services calls to the placeholder destination, where the list may have been received as part of the data at 310, to find possible provider systems.

A configuration for web service calls is generated (330). The configuration may be a run-time configuration, and a configuration may be generated at a consumer system and a configuration may be generated at a provider system, such as the run-time configurations 218, 246. A configuration at a consumer system may include a mapping of web service calls to a system, such as a mapping from the web service calls of 310 to the system of 320 based on the identification of 320. Based on the configuration, a run-time phase of the web service calls may call a system to provide requested web services.

Although FIG. 3 includes a certain combination and type of sub-processes, the process 300 may involve fewer, different, or additional sub-processes.

For example, the process 300 may further include configuration of technical aspects of a system landscape in a technical configuration phase, which may involve adding systems to domains having a security profile, selecting profiles for a domain, modifying profiles for a domain, and the like; whereas, the process 300 in FIG. 3 may represent a portion of a business configuration phase, which may further involve selecting other systems to activate and generating configuration profiles for those systems.

As another example, the process 300 may further include profile-based application of settings. For example, settings of a security profile may be applied to design-time settings to generate a run-time configuration. For example, during software development each web service and its operations may have design-time attributes set, which may be adapted to a particular web service (e.g. some web services may require an invocation with encoded data transmission for security). A system administrator (e.g., a technical administrator) may define one or more sets of policies for an invocation of web services, those policies may be collected in a security profile, and a security profile may be selected for one or more web services (e.g., by having a domain assigned to the provider system of the web services). Concrete configuration settings of a web service or a service consumer proxy may be derived by what may be referred to as a SOAP (which has been referred to as Simple Object Access Protocol but tends to be referred to as SOAP) application that describes ranges of available settings and contains rules for mapping combinations of design-time attributes and policies to concrete configuration settings. A SOAP application may be a collection of rules and settings specific for a kind of web service. The mapping rules for consumer proxies may also take the concrete configuration settings of the corresponding web service into account.

Although FIGS. 1-3 are referenced with discussions of consumer and provider systems, a system need not be limited to being solely a consumer or solely a provider system. For example, a system may act as both a consumer and provider system by consuming web services and offering web services.

Although each of the figures describes a certain combination of features, implementations may vary. For example, additional, different, or fewer components may be included in the system landscape 200 of FIG. 2.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product comprising a non-transitory computer-readable medium, the computer program product being operable to cause at least one processor to perform operations comprising:

receiving, at a consumer system during a business configuration phase of a deployment of a web services system, first data characterizing a web service call to a web service related to a business process implemented by a consumer application of the consumer system, the first data comprising a consumer proxy identifier to represent the web service call;

receiving, at the consumer system during the business configuration phase of the deployment of the web services system, second data characterizing a placeholder for the web service call, the second data comprising a name used to identify a system where the address of the system has not been determined prior to the business configuration phase, the system to be identified for the web service call during mapping of the system to the consumer proxy;

generating, at the consumer system during the business configuration phase of the deployment of the web services system, a configuration for the proxy identifier representing the web service call, the configuration comprising the address of the system instead of the name; and calling, at a run-time phase of the deployment of a web services system, the system to provide the web service based on the configuration.

2. The product of claim 1, wherein the web service call is in a group of web service calls having a common placeholder destination.

3. The product of claim 1, wherein the system is addressed by an identifier from a system landscape directory comprising an underlying directory of systems in an enterprise.

4. The product of claim 1, wherein the receiving of the first data and the second data and the generating are performed during the business configuration phase and the operations further comprise, during a technical configuration phase of a system landscape of the deployment of the web services system, adding the system to the system landscape at a service registry of the system landscape.

5. The product of claim 1, wherein the generating the configuration comprises applying a first profile to generate a mapping of settings for the configuration and the operations further comprise:

receiving an indication of a second profile to apply to the configuration of the proxy identifier, and applying the second profile to generate an updated version of the configuration at a point in time where the configuration is not being used by the proxy identifier.

6. The product of claim 1, wherein the first data characterizing the web service call comprises the consumer proxy identifier.

7. The product of claim 1, wherein the operations further comprise:

receiving a selection of the application to be activated as part of the business process;

searching for one or more systems that provide web services to respond to the web service call, the searching based at least in part on one or more of web service descriptions and web service classifications; and providing a user interface to display the systems and allow for a selection of the system to be mapped to the placeholder, the systems being listed in response to the selection of the application to be activated.

8. A computer-implemented method comprising:
receiving, at a consumer system during a business configuration phase of a deployment of a web services system, first data characterizing a web service call to a web service related to a business process implemented by a consumer application of the consumer system, the first data comprising a consumer proxy identifier to represent the web service call, the consumer system comprising a programmable processor and a memory;
receiving, at the consumer system during the business configuration phase of the deployment of the web services system, second data characterizing a placeholder for the web service call, the second data comprising a name used to identify a system where the address of the system has not been determined prior to the business configuration phase, the system to be identified for the web service call during mapping of the system to the consumer proxy identifier
generating, automatically at the consumer system during the business configuration phase of the deployment of the web services system, a configuration for the proxy identifier representing the web service call, the configuration comprising the address of the system instead of the name; and
calling, at a run-time phase of the deployment of a web services system, the system to provide the web service based on the configuration.

9. The method of claim 8, wherein the web service call is in a group of web service calls having a common placeholder destination.

10. The method of claim 8, wherein the receiving of the first data and the second data and the generating are performed during the business configuration phase and the method further comprises, during a technical configuration phase of a system landscape of the deployment of the web services system, adding the system to the system landscape at a services registry of the system landscape.

11. The method of claim 8, wherein the generating the configuration comprises applying a first profile to generate a mapping of settings for the configuration and the method further comprises:
receiving an indication of a second profile to apply to the configuration of the proxy identifier, and
applying the second profile to generate an updated version of the configuration when the configuration is not being used by the proxy identifier.

12. The method of claim 8, wherein the first data characterizing the web service call comprises a list of consumer proxy identifiers, the consumer proxy identifiers identifying which consumer proxies need to be configured, the consumer proxies identifying web services that are called by the consumer proxies.

13. The method of claim 8, wherein the method further comprises:
receiving a selection of the application to be activated as part of the business process;
searching for one or more systems that provide web services to respond to the web service call, the searching based at least in part on one or more of web service descriptions and web service classifications; and
providing a user interface to display the systems and allow for a selection of the system to be mapped to the placeholder, the systems listed in response to the selection of the application to be activated.

14. A system comprising:
a processor; and
a memory, wherein the processor and the memory are configured to perform a method comprising:
receiving, at a consumer system during a business configuration phase of a deployment of a web services system, first data characterizing a web service call to a web service related to a business process implemented by a consumer application of the consumer system, the first data comprising a consumer proxy identifier to represent the web service call;
receiving, at the consumer system during the business configuration phase of the deployment of the web services system, second data characterizing a placeholder for the web service call, the second data comprising a name used to identify a system where the address of the system has not been determined prior to the business configuration phase, the system to be identified for the web service call during mapping of the system to the consumer proxy identifier;
generating, at the consumer system during the business configuration phase of the deployment of the web services system, a configuration for the proxy identifier representing the web service call, the configuration comprising the address of the system instead of the name; and
calling, at a run-time phase of the deployment of a web services system, the system to provide the web service based on the configuration.

15. The system of claim 14, wherein the system is a system of a system landscape directory.

16. The system of claim 14, wherein a second, larger application comprises the application as a component of the second application.

17. The system of claim 14, wherein the placeholder is a placeholder for a destination not being uniquely identifiable during design-time of the application.

18. The system of claim 14, wherein the web service call is are in a group of web service calls having a common placeholder.

19. The system of claim 14, wherein the receiving of the first data and the second data and the generating are performed during the business configuration phase and the method further comprises, during a technical configuration phase of a system landscape of the deployment of the web services system, adding the system to the system landscape at a services registry of the system landscape.

20. The system of claim 14, wherein the generating the configuration comprises applying a first profile to generate a mapping of settings for the configuration and the operations further comprise:
receiving an indication of a second profile to apply to the configuration of the proxy identifier, and
applying the second profile to generate an updated version of the configuration when the configuration is not being used by the proxy identifier.

* * * * *